United States Patent [19]

Nishii et al.

[11] Patent Number: 5,417,480
[45] Date of Patent: May 23, 1995

[54] BRAKE SYSTEM FOR A MOTOR VEHICLE

[75] Inventors: Michiharu Nishii, Toyota; Satoshi Ishida, Chiryu, both of Japan

[73] Assignee: Aisin Seiki Kabushiki Kaisha, Kariya, Japan

[21] Appl. No.: 332,465

[22] Filed: Oct. 31, 1994

Related U.S. Application Data

[63] Continuation of Ser. No. 28,193, Mar. 9, 1993, abandoned.

[30] Foreign Application Priority Data

Mar. 12, 1992 [JP] Japan ................... 4-053811

[51] Int. Cl.[6] .................................... B60T 15/46
[52] U.S. Cl. ................................ 303/84.1; 303/901
[58] Field of Search ............... 303/84.1, 84.2, 113.2, 303/116.1, 116.2, 119.1, 9.62, 9.75, 900, 901

[56] References Cited

U.S. PATENT DOCUMENTS

| | | | |
|---|---|---|---|
| 4,685,747 | 8/1987 | Belart et al. ............... | 303/901 X |
| 4,898,430 | 2/1990 | Becker-Endrigkeit et al. ... | 303/84.2 |
| 5,002,345 | 3/1991 | Becker ...................... | 303/901 X |
| 5,141,293 | 8/1992 | Gowda ...................... | 303/84.2 |
| 5,167,442 | 12/1992 | Alaze et al. .............. | 303/119.2 |
| 5,213,399 | 5/1993 | Burgdorf et al. ........ | 303/116.2 |
| 5,297,862 | 3/1994 | Reinartz et al. .......... | 303/113.1 |
| 5,335,984 | 8/1994 | Alaze et al. .............. | 303/900 X |

FOREIGN PATENT DOCUMENTS 4027565 3/1992 Germany .
3-3095 1/1991 Japan .

*Primary Examiner*—Mark T. Le
*Assistant Examiner*—Lee W. Young
*Attorney, Agent, or Firm*—Burns, Doane, Swecker & Mathis

[57] ABSTRACT

A hysteresis control valve (10) is disposed between a master cylinder and a wheel cylinder. The hysteresis control valve comprises a first stepped piston (12) fixed within a cylinder bore (11a) and including a bypass bore (12b) communicatable with the wheel cylinder, a second stepped piston (13) slidably mounted within the cylinder bore (11a) and having at its one end a valve body (14) opened under a given pressure to prevent communication through the bypass bore 12b, and a cup seal (15) disposed between the outer periphery of the first stepped piston (12) and the inner periphery of the cylinder bore (11a).

9 Claims, 4 Drawing Sheets

BRAKE SYSTEM FOR A MOTOR VEHICLE

This application is a continuation of application Ser. No. 08/028,193, filed Mar. 9, 1993, now abandoned.

BACKGROUND OF THE INVENTION

1. Field of the Invention

The present invention relates to a brake system for a motor vehicle which is designed particularly to provide hydraulic braking pressure with hysteresis characteristics.

2. Description of the Related Art

To improve riding comfort, various means have been proposed to provide a brake with hysteresis characteristics. One such means is to provide a vacuum booster with a reaction rubber disk between an input piston and an output rod.

In order to obtain sufficient hysteresis in a hydraulic booster, a seal may more tightly be clamped between the input and output members. This results in an increase in the resistance to sliding movement of the input member and thus, requires greater pedal pressure.

Accordingly, it is an object of the present invention to provide a brake system for a motor vehicle, which provides sufficient hysteresis characteristis in a hydraulic pressure source.

SUMMARY OF THE INVENTION

In order to achieve the foregoing object, the present invention provides a brake system for a motor vehicle, which comprises a hydraulic pressure source for developing a given hydraulic pressure in response to pedal pressure, a wheel cylinder mounted to a wheel and adapted to use the hydraulic pressure to brake the wheel, an on-off valve disposed between the hydraulic pressure source and the wheel cylinder and rendered operative to allow unidirectional transfer of the hydraulic pressure from the wheel cylinder to the hydraulic pressure source through a one-way valve opened under a given pressure, when the hydraulic pressure is applied to one end of the on-off valve, the on-off valve being rendered inoperative to allow transfer of the hydraulic pressure, bias means disposed at the other end of the on-off valve and providing a given bias to the on-off valve, and a check valve disposed in parallel relationship to the on-off valve and adapted to allow unidirectional transfer of hydraulic pressure from the hydraulic pressure source to the wheel cylinder.

In operation, when a brake pedal is depressed by a driver, the hydraulic pressure source develops hydraulic pressure in response to pedal pressure. This hydraulic pressure is supplied through the check valve to the wheel cylinder to brake the wheel and to render the on-off valve operative. When the driver stops depressing the brake pedal, the hydraulic pressure in the wheel cylinder opens the one-way valve and is returned to the hydraulic pressure source since the on-off valve is in its operative state. At that time, when the hydraulic pressure applied to the on-off valve becomes less than the bias of the spring, the hydraulic pressure source and the wheel cylinder are in direct communication with each other.

DESCRIPTION OF THE PREFERRED EMBODIMENTS

The present invention will now be described, by way of example, with reference to the drawings.

Figure 1:
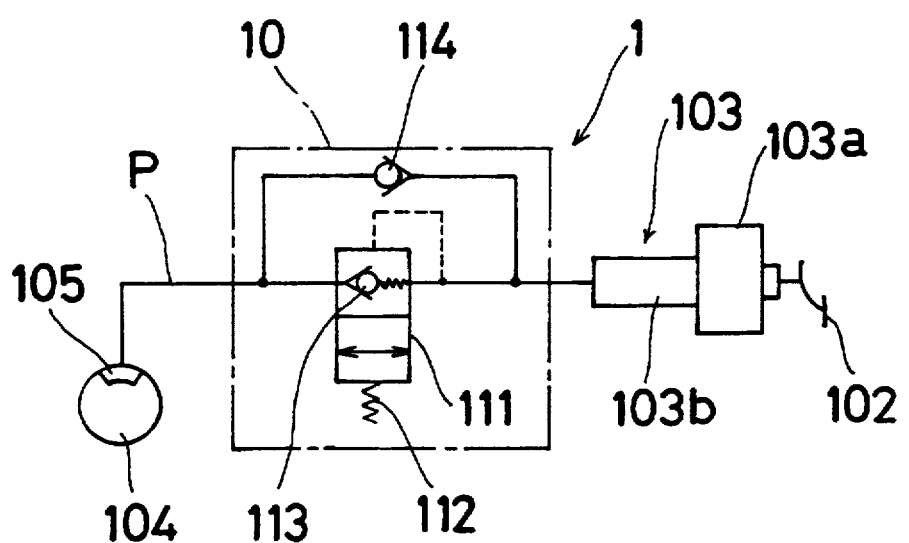
FIG. 1 is a schematic view showing the structure of a brake system for a motor vehicle, according to the present invention.

Referring to FIG. 1, a vehicular brake system 100 has a hydraulic pressure source 3 for developing hydraulic pressure in response to pedal pressure applied to a brake pedal 102, a wheel cylinder 105 mounted to wheels 104 and operable to brake a motor vehicle when hydraulic pressure is fed from the hydraulic pressure source 103, and a hysteresis control valve 10 (hereinafter, simply referred to as a valve) disposed in a line P between the hydraulic pressure source 103 and the wheel cylinder 105.

The hydraulic pressure source 103 includes a booster 103a for increasing pedal pressure applied to the brake pedal 102 by a driver by a given number of times, and a master cylinder 103b for developing hydraulic pressure in response to the pedal pressure thus raised.

The valve 10 includes an on-off valve 111 having one end to receive the hydraulic pressure, a spring 112 mounted to the other end of the on-off valve 111, a one-way valve 113 opened under a given pressure to allow unidirectional transfer of hydraulic pressure from the wheel cylinder 105 toward the hydraulic pressure source 103, and a check valve 114 disposed in the line P in parallel relationship to the on-off valve 111 to allow unidirectional transfer of hydraulic pressure from the hydraulic pressure source 103 toward the wheel cylinder 105.

The on-off valve 111 is operable to inhibit the transfer of hydraulic pressure from the hydraulic pressure source 103 toward the wheel cylinder 105 and allow the transfer of hydraulic pressure from the wheel cylinder 105 toward the hydraulic pressure source 103 through the one-way valve when the hydraulic pressure applied to the one end of the on-off valve 111 by the hydraulic pressure source 103 is greater than the bias of the spring 112. The on-off valve 111 is rendered inoperative to allow the transfer of hydraulic pressure through the line P when the hydraulic pressure applied to the one end of the on-off valve 111 by the hydraulic pressure source 103 becomes less than the bias of the spring 112. When the brake pedal 102 is depressed by the driver, hydraulic pressure is supplied from the master cylinder 103. The on-off valve 111 is then rendered operable to feed the hydraulic pressure to the wheel cylinder 105 through the check valve 114 so as to brake the wheels. When the brake pedal 102 is depressed to a lesser extent, if hydraulic pressure in the line P between the on-off valve 111 and the wheel cylinder 105 exceeds the sum of hydraulic pressure in the line P between the on-off valve 111 and the master cylinder 103c and pressure under which the one-way valve 113 can be opened, the excess amount of hydraulic pressure then opens the one-way valve 113 and is returned to the master cylinder 103b. If hydraulic pressure in the line P between the on-off valve 111 and the master cylinder 102a becomes less than the bias of the spring 112 when the brake pedal 102 is released, the on-off valve 111 is rendered inoperative to allow the transfer of hydraulic pressure through the line P. No pressure thus remains in the wheel cylinder 105 to avoid further braking effect.

Figure 2:
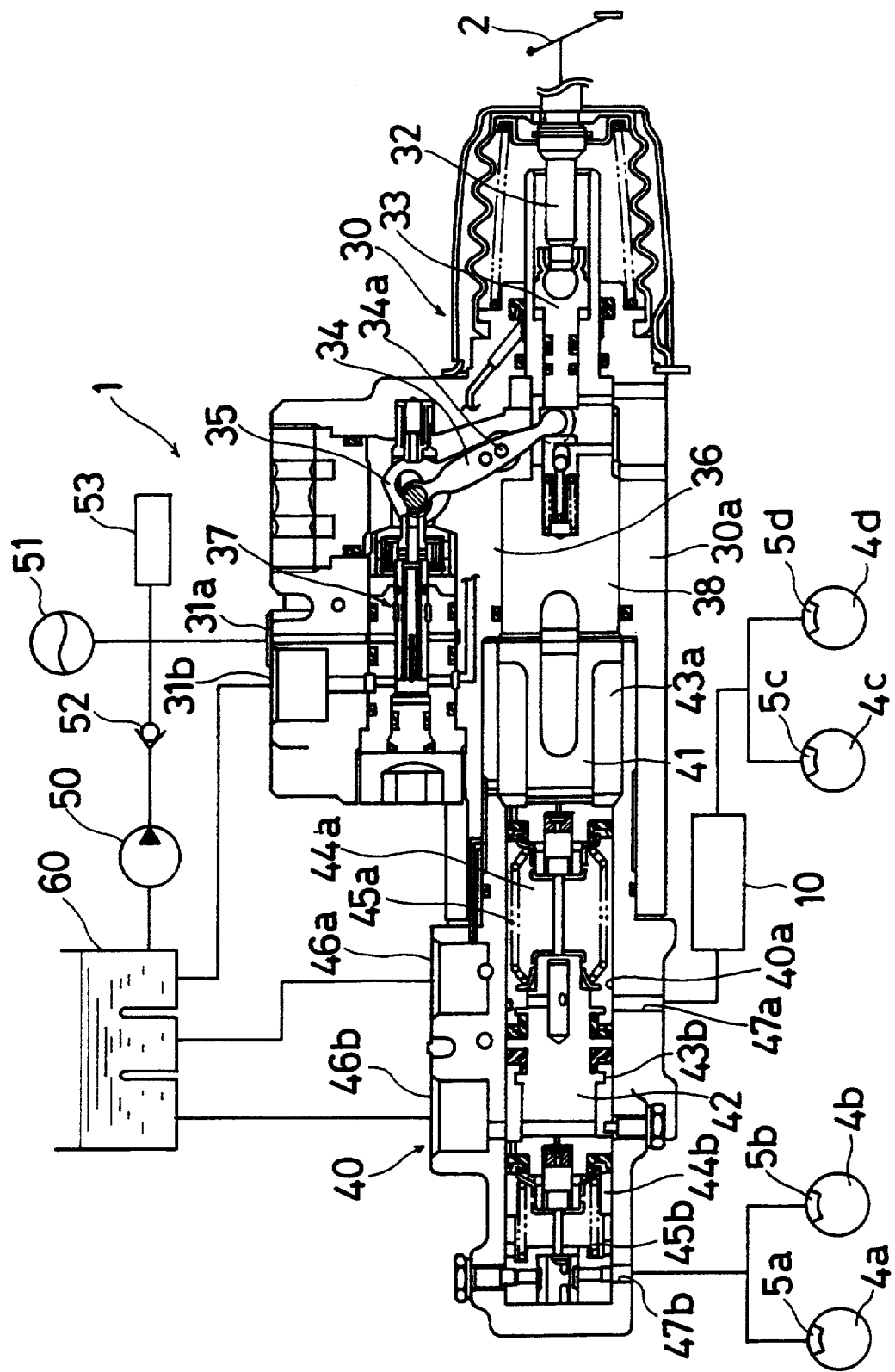
FIG. 2 is a view showing the structure of a hydraulic booster to which the present invention is applied.
Figure 3:
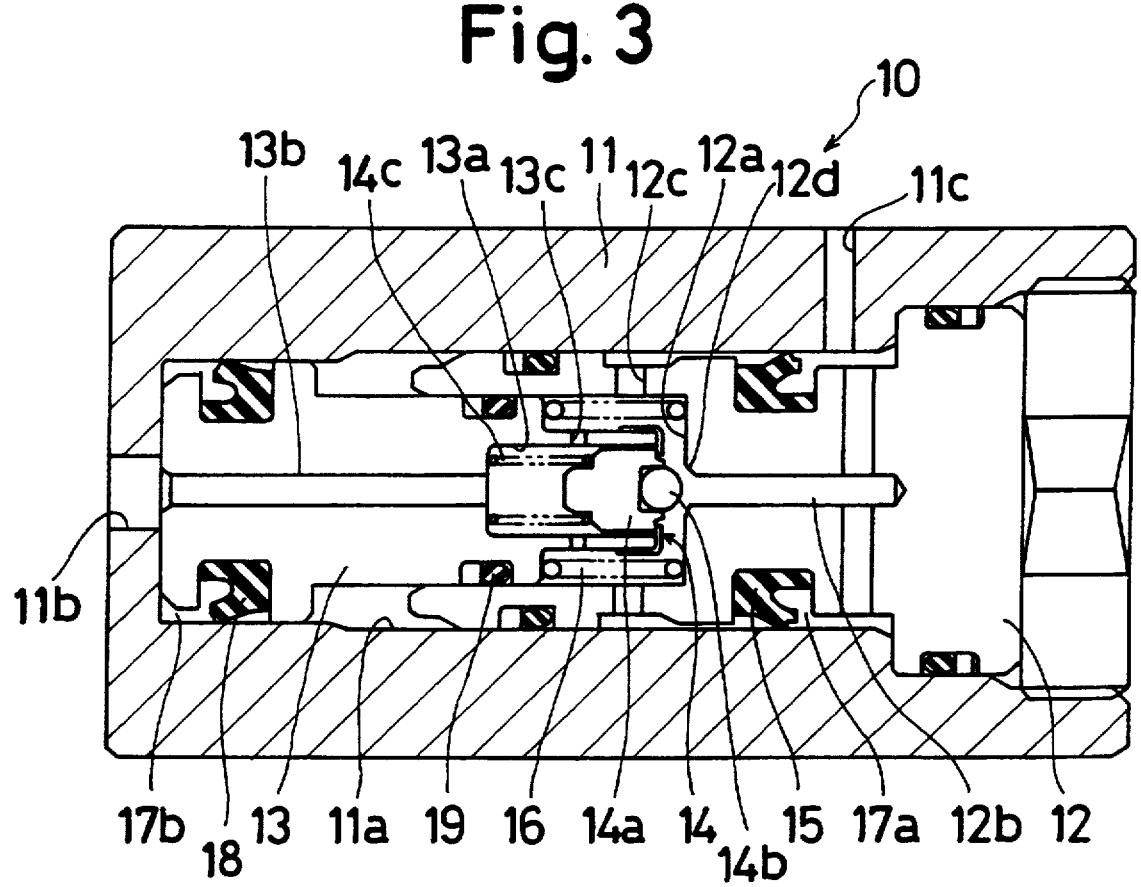
FIG. 3 is a sectional view showing one form of a hysteresis control valve.

Referring to FIGS. 2 and 3, there are shown one form of a hydraulic booster and a valve 10 to which the present invention is applied. As shown in FIG. 2, the vehicular brake system 1 includes a hydraulic booster 30, tandem master cylinder (hereinafter, simply referred to as a master cylinder) 40, a hydraulic pump 50, a reservoir 60, and wheel cylinders 5a to 5d mounted to wheels 4a to 4d, and the valve 10.

The hydraulic pump 50 is controlled by an electric motor (not shown) and supplies hydraulic pressure through a check valve 52. A pressure sensor 53 sends a signal to cause a control means (not shown) to intermittently control the hydraulic pump 50. The hydraulic pump 50 then maintains the internal pressure of an accumulator 51 at a predermined level.

The hydraulic booster 30 is coupled to the accumulator 51 and the reservoir 60 through ports 31a and 31b. The hydraulic booster 30 comprises a housing 30a, an input rod 32 integrally connected to the brake pedal 2, a reaction piston 33 integrally connected to the input rod 32, a support lever 34 having one end operatively connected to the reaction piston 33, a control lever 35 pivotably connected to the support lever 34 through a pin 34a, a spool valve 37 moved by the control lever 35 to supply hydraulic pressure from the accumulator 51 to a power chamber 36 in response to pedal pressure when the brake pedal 2 is pressed, and a power piston 38 connected to a first piston 41 of the master cylinder 40 and adapted to push the first piston 41 when hydraulic pressure is supplied to the power chamber 36 by the spool valve 37.

The master cylinder 40 has a cylinder bore 40a within which the first piston 41 and a second piston 42 are slidably mounted in a liquid-tight manner. The cylinder bore 40a is divided by the first piston 41 and the second piston 42 into a first supply chamber 43a communicated with the reservoir 60 through a port 46a, a second supply chamber 43b communicated with the reservoir 60 through a port 46b, a first pressure chamber 44a communicated with wheel cylinders 5c and 5d through a port 47a, and a second pressure chamber 44b communicated with wheel cylinders 5a and 5b through a port 47b. A first spring 45a is disposed between the first piston 41 and the second piston 42. A second spring 45b is disposed between the second piston 42 and one end (left end in FIG. 2) of the cylinder bore 40a. The first pressure chamber 44a is also communicated with the wheel cylinders 5c and 5d through the valve 10.

The valve 10 will now be described with reference to FIG. 3.

The valve 10 has a housing 11 in which a cylinder bore 11a is defined, a first stepped piston 12 fixed within the cylinder bore 11a by a plug, a second stepped piston 13 slidably mounted within the cylinder bore 11a and having one end received in a recess 12a formed in one end of the first stepped piston 12, the second stepped piston corresponding to the one-off valve, a valve body 14 provided in one end of the second stepped piston 13 and corresponding to the one-way valve, a cup seal 15 disposed between the outer periphery of the first stepped piston 12 and the inner periphery of the cylinder bore 11a and corresponding to the check valve, and a spring 16 mounted within the recess 12a between the first stepped piston 12 and the second stepped piston 13 and corresponding to the bias means. It is more effective to mount the valve to a portion of the brake system where greater braking load is exerted. Thus, the valve 10 is preferably mounted to one end of a longitudinal hydraulic line or one ends of diagonal hydraulic lines associated with the front wheels.

The housing 11 is communicated with the first pressure chamber 44a (see FIG. 2) of the master cylinder 40 and the wheel cylinders 5c and 5d via ports 11b and 11c, respectively.

The first stepped piston 12 includes a bypass port 12b and radial ports 12c to provide a fluid communication between the recess 12a and a first fluid chamber 17a defined between the first stepped piston 12 and the cylinder bore 11a. The bypass port 12b has one end open to the recess 12a. A valve seat 12d is formed at that end of the bypass port 12b to receive the valve body 14.

The valve body 14 is received in the recess 13a of the second stepped piston 13. A through bore 13b is axially formed in the second stepped piston 13. A cup seal 18 is mounted between the outer periphery of the second stepped piston 13 and the inner periphery of the cylinder bore 13a. The through bore 13b provides a communication between the recess 13a and a second fluid chamber 17b formed between the second stepped piston 13, the cup seal 18 and the cylinder bore 11a. A seal 19 is disposed between the recess 12a and the second stepped piston 13 to maintain them in a fluid-tight manner. A recess 13a is communicated with the recess 12a through radial ports 13c.

The valve body 14 includes a body 14a slidably mounted within the recess 13a, a ball 14b fixed to the body 14a, and a spring 14c disposed between the body 14a and the second stepped piston 13. A retainer 14d is attached to the end surface of the second stepped piston 13 to hold the body 14a in position within the recess 13a. The ball 14b can be seated on the valve seat 12d to prevent communication between the bypass port 12b and the recess 12a.

Figure 4:
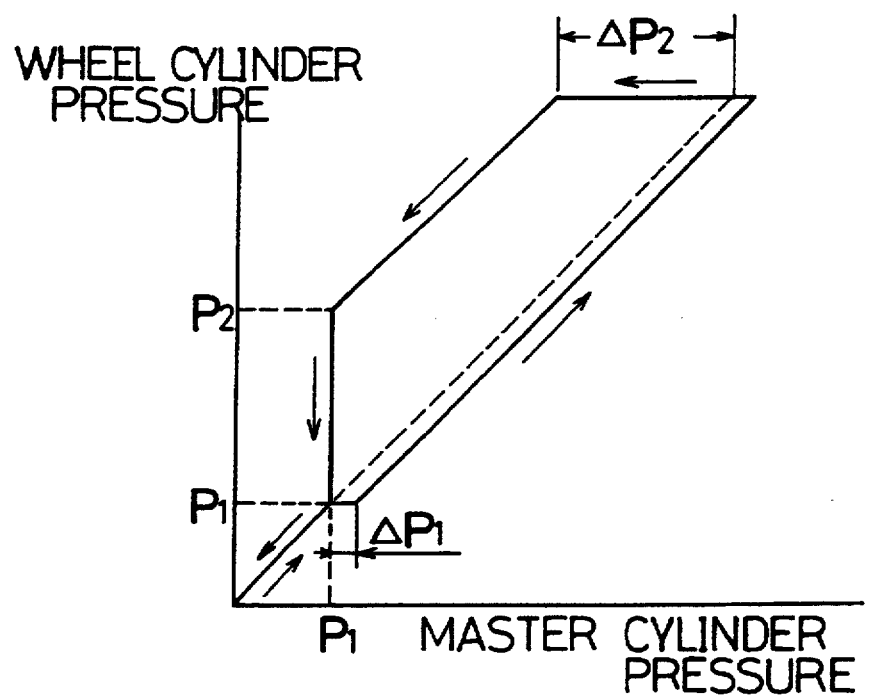
FIG. 4 is a graph showing braking characteristics obtained according to one embodiment of the present invention.

The operation of the brake system will now be described with reference to FIGS. 2 to 4.

As the brake pedal 2 is depressed by the driver, hydraulic pressure is fed from the accumulator 51 to the power chamber 36 under the influence of the spool valve 37. This causes the power piston 38 to push the first piston 41 and the second piston 42 to increase the pressure in the first pressure chamber 44a and that of the second pressure chamber 44b, respectively. The pressure in the first chamber 44a thus raised is then fed through the valve 10 to the wheel cylinders 5c and 5d. The pressure in the second chamber 44b thus raised is also fed to the wheel cylinders 5a and 5b.

At this time, the pressure in the first chamber 44a is fed to the second chamber 17b of the valve 10. This pressure is then fed to the wheel cylinders 5c and 5d through the through bore 13b, the recess 13a, the radial ports 13c, the recess 12a, the bypass bore 12b, the first fluid chamber 17a and the port 11c until a force (rightward force in FIG. 3) developed as a result of the difference in area becomes equal to the bias of the spring 16. When this force exceeds the bias of the spring 16, the second stepped piston 13 is slid to the right in FIG. 3 until the ball 14b is seated on the valve seat 12d. Also, the pressure is fed to the wheel cylinders 5c and 5d through the through bore 13b, the recess 13a, the radial ports 13c, the recess 12a, the radial ports 12c, the first fluid chamber 17a and the port 11c. When the pressure reaches the second fluid chamber 17a, the cup seal 15 is deformed between the outer periphery of the cup seal 15 and the cylinder bore 11a to cause a slight delay in increasing the pressure in the wheel cylinders 5c and 5d as indicated by Δ P1 in FIG. 4. However, this delay is quite small and does not result in a corresponding delay in exerting braking effect.

When the brake pedal 2 is released, hydraulic braking pressure in the hydraulic line between the wheel cylinders 5c and 5d and the port 11c is returned to the recess 12a via the first fluid chamber 17a. However, the cup seal 15 prevents the hydraulic pressure from flowing back to the recess 12a. Hydraulic pressure in the bypass bore 12b communicated with the first fluid chamber 17a is applied to the ball 14b. Hydraulic pressure in the first pressure chamber 44a of the master cylinder 40 is gradually returned to the reservoir 60. This results in a decrease in the pressure in the first pressure chamber 44a. Accordingly, hydraulic pressure as indicated by Δ P2 in FIG. 4 is maintained until the sum of the hydraulic pressure in the recess 13a and the bias of the spring 14c becomes less than the hydraulic pressure in the bypass bore 12b applied to the ball 14b. Also, until a bias force developed by hydraulic pressure as introduced into the second fluid chamber 17b becomes less than the bias of the spring 16, the hydraulic pressure in the bypass bore 12b causes the body 14a and the ball 14b to slide to the left in FIG. 3. The hydraulic pressure is then returned from the wheel cylinders 5c and 5d to the master cylinder 40 through the port 11c, the first fluid chamber 17a, the bypass port 12b, the recess 13a, the through bore 13b and the port 11b. Hysteresis is developed as indicated by Δ P2 in FIG. 4 until the sum of the hydraulic pressure in the recess 13a and the bias of the spring 14c becomes less than the hydraulic pressure in the bypass bore 12b applied to the ball 14b.

Figure 5:
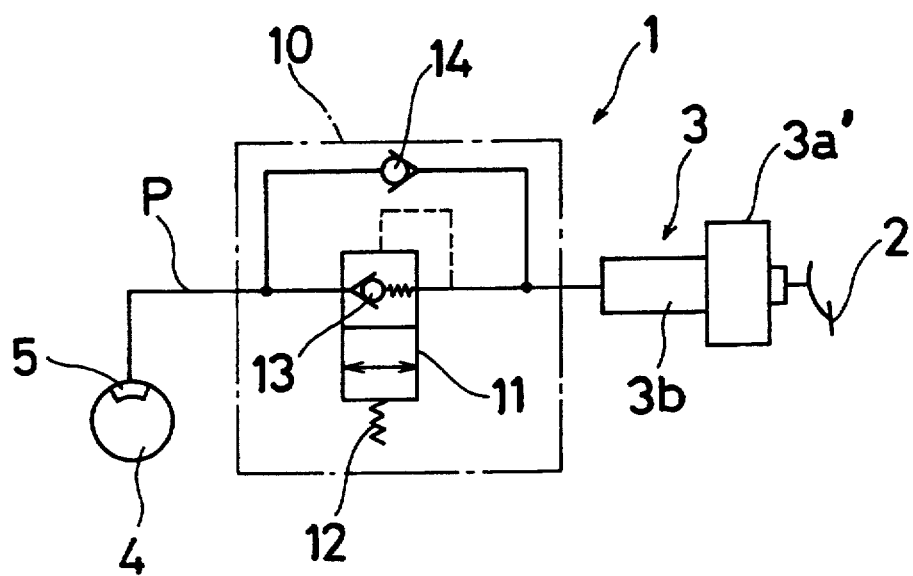
FIG. 5 is a schematic view similar to FIG. 1 showing the structure of a brake system for a motor vehicle in which a vacuum booster is employed.

In the illustrated embodiment, the present invention is applied to a hydraulic booster. It can also be applied to a vacuum booster 3a, as depicted in FIG. 5.

According to the present invention, when the driver stops depressing the brake pedal, the hydraulic pressure in the wheel cylinders opens the one-way valve and is returned to the hydraulic pressure source since the on-off valve is in its operative state. When the hydraulic pressure applied to the on-off valve becomes less than the bias of the spring, the hydraulic pressure source and the wheel cylinders are directly communicated with one another. Thus, a predetermined amount of hysteresis can be obtained without leaving any pressure in the wheel cylinders.

What is claimed is:

1. A brake system for a motor vehicle comprising:

a hydraulic pressure source for developing hydraulic pressure in response to pedal pressure;

a wheel cylinder mounted to a wheel and adapted to use said hydraulic pressure to brake the wheel;

an on-off valve disposed between said hydraulic pressure source and said wheel cylinder, said on-off valve having one end to which is applied the hydraulic pressure and an opposite end;

first bias means disposed at the opposite end of said on-off valve and providing a predetermined pressure to said on-off valve; and a check valve disposed in parallel relationship to said on-off valve and adapted to allow unidirectional transfer of hydraulic pressure from said hydraulic pressure source to said wheel cylinder; and said on-off valve including a passage for allowing transfer of hydraulic pressure between said hydraulic pressure source and said wheel cylinder when the hydraulic pressure is less than said predetermined pressure, and a one-way valve which opens when the hydraulic pressure exceeds a given pressure for allowing transfer of hydraulic pressure from said wheel cylinder to said hydraulic pressure source when said hydraulic pressure is more than said predetermined pressure, said one-way valve including second bias means for closing the one-way valve with said given pressure.

2. A brake system for a motor vehicle as recited in claim 1, wherein said check valve comprises a cup seal.

3. A brake system for a motor vehicle as recited in claim 1, wherein said hydraulic pressure source comprises a hydraulic booster.

4. A brake system for a motor vehicle as recited in claim 1, wherein said hydraulic pressure source comprises a vacuum booster.

5. A brake system for a motor vehicle as recited in claim 2, wherein said hydraulic pressure source comprises a hydraulic booster.

6. A brake system for a motor vehicle as recited in claim 2, wherein said hydraulic pressure source comprises a vacuum booster.

7. A brake system for a motor vehicle as recited in claim 1, including a cup-seal disposed adjacent the one end of the on-off valve.

8. A brake system for a motor vehicle as recited in claim 1, wherein said one-way valve includes a valve body slidably positioned in a recess formed in the opposite end of the on-off valve and a spring for urging the valve body away from a bottom of the recess.

9. A brake system for a motor vehicle as recited in claim 8, wherein at least a portion of said passage extends between the recess in the on-off valve and the one end of the on-off valve.

* * * * *